Jan. 27, 1959 W. E. RENNER ET AL 2,870,614
SELF CONTAINED AIR CONDITIONING UNITS
Filed July 1, 1954 4 Sheets-Sheet 1

INVENTORS
William E. Renner and
BY William A. Arzberger
Herman Seid
Atty.

Jan. 27, 1959 W. E. RENNER ET AL 2,870,614
SELF CONTAINED AIR CONDITIONING UNITS
Filed July 1, 1954 4 Sheets-Sheet 2

INVENTORS
William E. Renner and
BY William A. Argberger
Herman Seid
Atty.

Jan. 27, 1959   W. E. RENNER ET AL   2,870,614
SELF CONTAINED AIR CONDITIONING UNITS
Filed July 1, 1954   4 Sheets-Sheet 4

INVENTORS
William E. Renner and
BY William A. Argberger
Herman Seid
atty.

United States Patent Office 2,870,614
Patented Jan. 27, 1959

2,870,614
SELF CONTAINED AIR CONDITIONING UNITS

William E. Renner, Cazenovia, and William A. Arzberger, North Syracuse, N. Y., assignors to Carrier Corporation, Syracuse, N. Y., a corporation of Delaware Application July 1, 1954, Serial No. 440,618

9 Claims. (Cl. 62—429)

This invention relates generally to air conditioning equipment and more particularly to air conditioning equipment for use in an enclosure such as a mobile home, more commonly known as a house trailer.

In the past, many attempts have been made to provide house trailers with air conditioning. Foremost among these attempts was the use of a self contained air conditioning unit of the type usually referred to as room coolers, mounted in an opening provided in one of the walls of the trailer. This particular approach has proven unsatisfactory because of the additional load, due to the weight of the unit, placed upon the walls of the trailer. The invention herein disclosed involves an air conditioning unit which is adapted to be placed over an opening in the floor of a trailer and which is styled to represent a cabinet or end table. In trailers of the type under consideration, space is at a premium. It is therefore, an object of this invention to provide an air conditioning unit for use in a house trailer which does not require considerable space and which may be fitted into the existing furniture arrangement of the trailer without difficulty.

It is a further object of this invention to provide an air conditioning unit as described that may be placed over an opening in the floor of the trailer so as to draw upwardly into the unit from the space beneath the trailer, the air necessary to cool certain of the components in the refrigeration system contained within the air conditioning units.

Specifically, the invention contemplates the use of a frame member which is adapted to span the opening in the floor which serves to support on the top thereof, certain of the elements of the refrigeration system. In addition thereto, the frame further supports a casing which in turn supports the evaporator or cooling coil of the air conditioning unit. The entire assembly is surrounded by a housing which in combination with the casing forms separate compartments defining certain predetermined paths of flow for the air to be conditioned and the air to be used for cooling the components referred to above.

Other objects and features of this invention will be apparent from a consideration of the ensuing specification and drawings in which.

Figure 1:
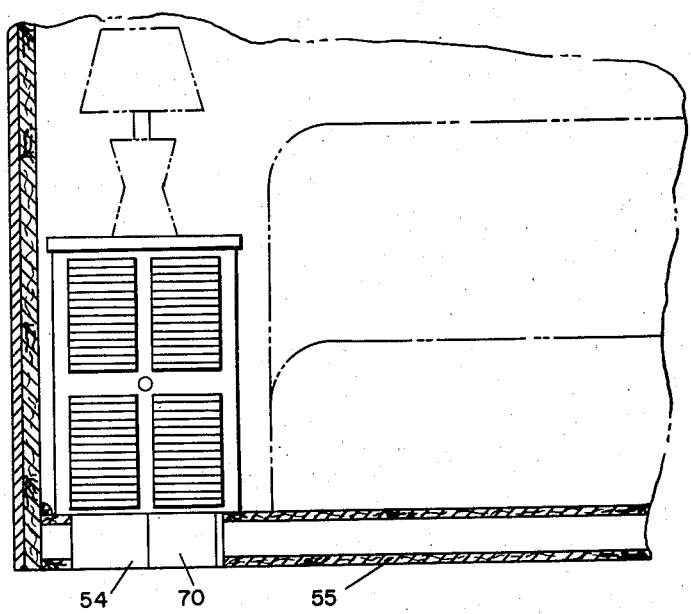
Figure 1 is a fragmentary view partly in section showing the disposition of the air conditioning unit with respect to the side and end wall of the trailer and a couch.
Figure 2:
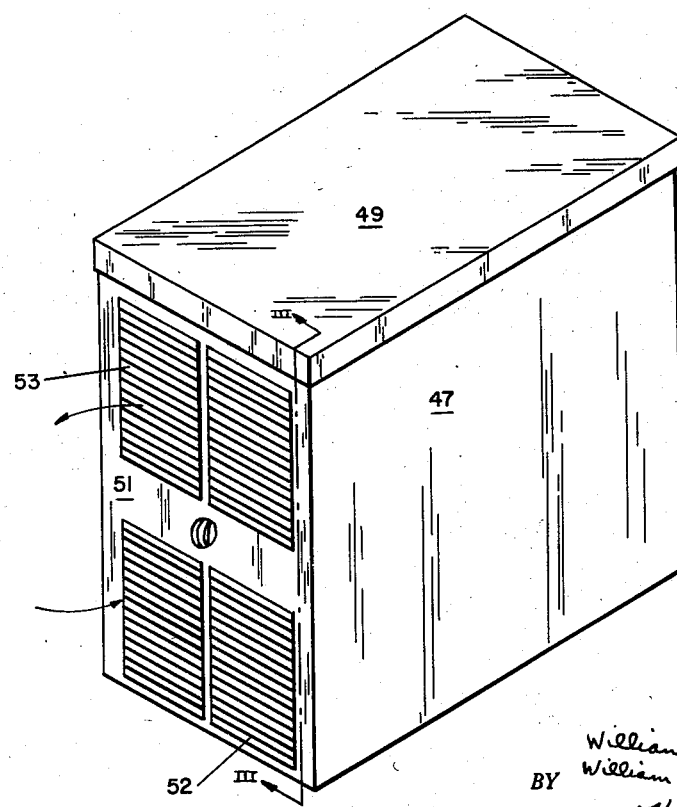
Figure 2 is an isometric view of the air conditioning unit forming the invention, the unit being provided with the outer covering forming a housing therefor.

Referring more particularly to the drawings for one illustration of a unit embodying the invention, it will be noted that there is provided a supporting framework 10 consisting of a base frame 11 formed by joining conventional structural members, such as angle irons, together at their extremities. The frame work 10 also includes an upper base frame 12 spaced from the lower frame by vertical uprights 13. Thus, there is provided a framework having opposed sides and a top and bottom. Suspended from the underside of the upper frame 12 through a saddle 14 is a motor 15 provided with a power shaft 16 extending substantially parallel to the longitudinal axis of the framework 10 and projecting beyond one side thereof.

Mounted on top of the upper frame 12 is a compressor 17. It will be noted that the compressor is mounted intermediate the front or left end of the frame and the rear or right end of the frame as viewed in Figure 3. The structural member forming the rear end of frame 12 is provided with an extended bearing surface 18 adapted to support thereon a condenser 19.

Mounted on the rear side of framework 10 is a condensate disposal assembly 20 provided with a receiver portion 21 extending rearwardly of the framework 10. Projecting upwardly from the receiver are connecting panel 22 and wing panels 23. The condensate disposal assembly is connected to the framework through panel 22. As shown more particularly in Figure 3, a discharge line 24 is shown extending from compressor 17 downwardly through the framework and rearwardly through the connecting panel 22 of the condensate disposal assembly from where it extends downwardly to the bottom of the assembly into the receiver.

Figure 5:
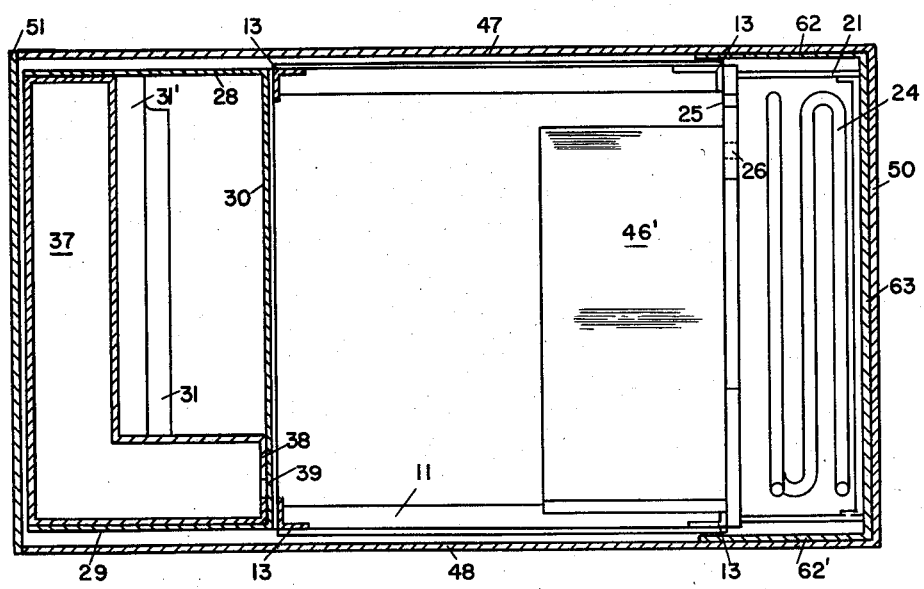
Figure 5 is an enlarged sectional plan view taken along line 5—5 in Figure 3.

Referring more particularly to Figure 5, it will be noted that the discharge line is formed with a coiled portion resting on the bottom of the condensate receiver for a purpose to be later described. The discharge line then extends upwardly to the top of the condenser. The connecting panel 22 of the condensate disposal assembly is provided, as shown in Figure 5, with two openings 25 and 26. The first opening 25 is adapted to accommodate one end of a drain member 27' through which condensate from the evaporator 35 flows (note Figure 3) and the opening 26 serves as an overflow in the event an accumulation of condensate, in excess of that which may be evaporated by the hot gas flowing through the coiled portion of the discharge line, occurs in the bottom of the receiver.

To provide further support for the condenser 19 it may be desirable to surround the condensate disposal assembly with a casing 60 formed with side walls 62 and 62' and a rear wall 63. The upper portion of the side walls have flanges 64 extending inwardly. The flanges are connected to the condenser 19. The side walls 62 and 62' are contiguous to the side panels of the housing so as to prevent leakage of cooling air around the sides of the condenser.

Figure 3:
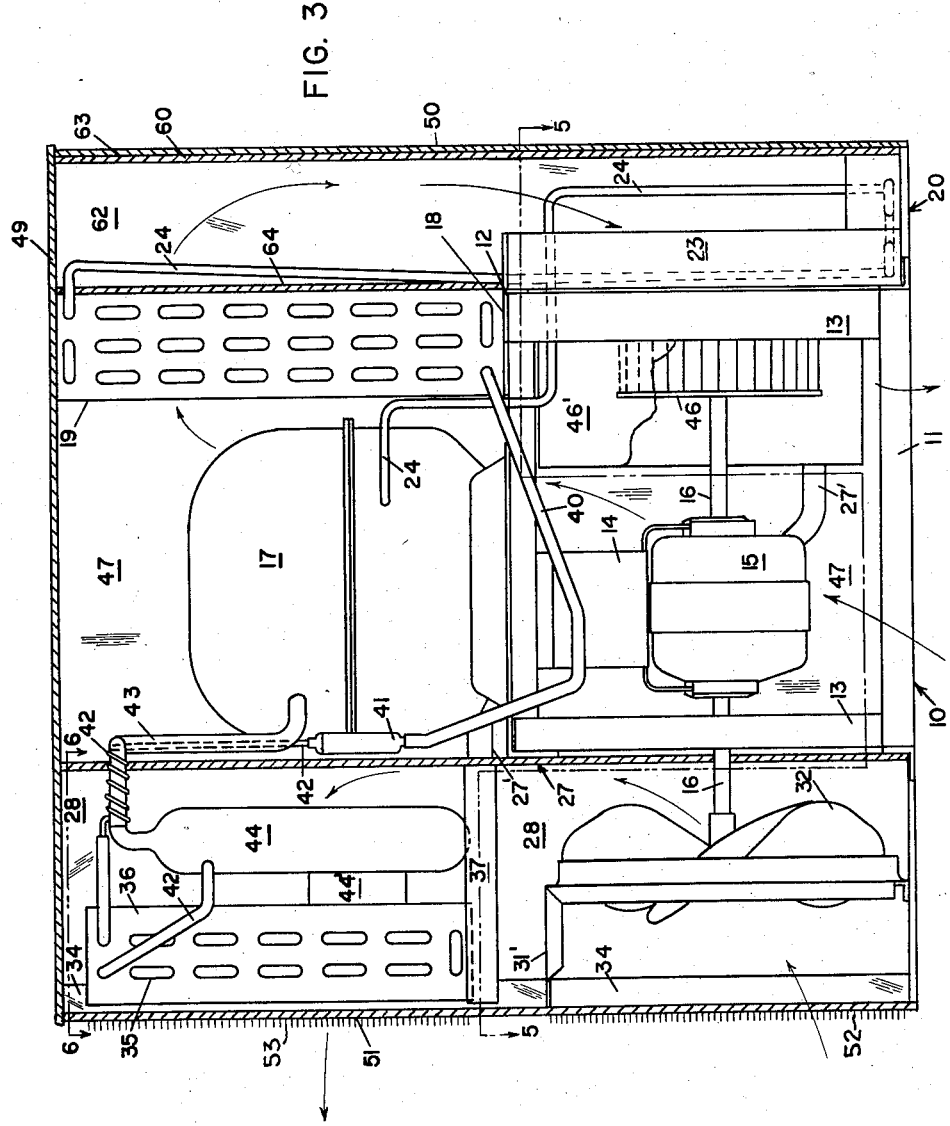
Figure 3 is an enlarged side view partly in section, with certain parts broken away for clarity taken on line III—III of Figure 2, of the air conditioning unit with the housing removed showing the particular unique disposition of the components of the refrigeration system.
Figure 4:
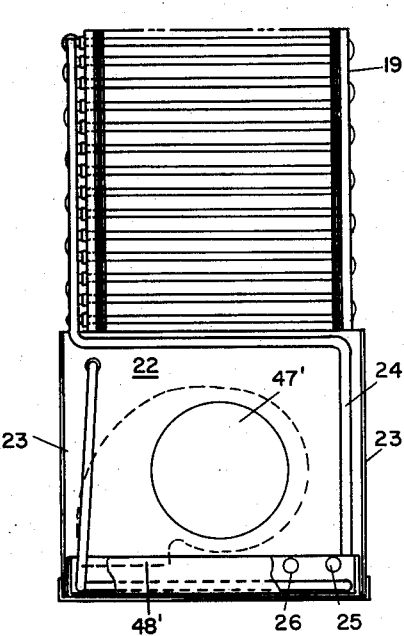
Figure 4 is an end view of the unit with certain parts removed in the interest of clarity.
Figure 6:
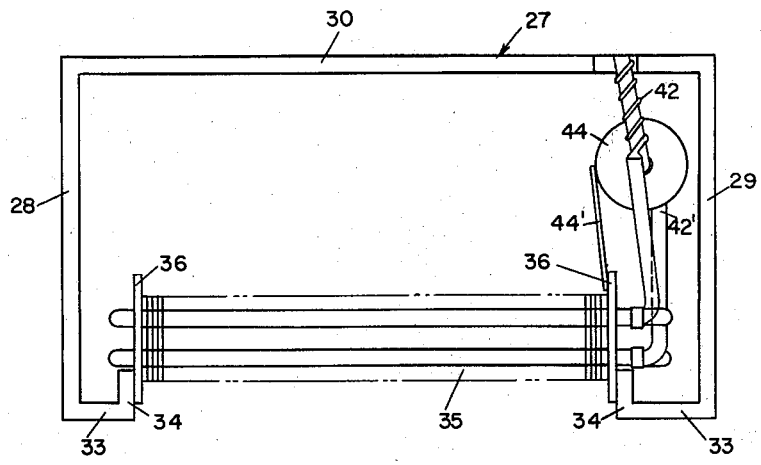
Figure 6 is a fragmentary view in plan, taken along line 6—6 in Figure 3, showing the manner in which the evaporator or cooling coil of the unit is attached to the casing member.

The front or side opposite the side of the framework supporting the condensate disposal assembly serves to support a generally U-shaped casing member 27 as shown in Figures 3 and 6. The casing 27 is provided with opposed side walls 28 and 29 and a rear wall 30 connecting the opposed side walls. The rear wall 30 is connected to the framework 10 and provided with an opening in the lower portion thereof to permit the power shaft 16 of the motor 15 to extend within the casing. The lower portion of the casing 27 serves to support a wall 31 having an opening in which a fan 32, mounted on the end of the shaft 16, is positioned. The top of the wall is connected to the front of the casing by extended portion 31'. In the upper portion of the casing, it will be noted that the side walls are provided with extensions 33 directed toward the center of the casing. The extensions 33 are further provided with end portions 34 disposed substantially parallel to the side walls 28 and 29 which serve to mount the evaporator coil 35 as shown in Figure 6. Preferably, the evaporator coil is mounted on the end portions 34 through tube sheets 36. Also connected to the side walls of the casing 27 is an L-shaped condensate pan 37 adapted to serve as a means for collecting condensate that may form on the evaporator coil. The pan 37 is mounted so that condensate will gravitate rearwardly thereof and has an opening 39 in the rear wall 38. The line 27 is shown connecting the opening 39 in the pan 37 with the opening 25 in the condensate disposal receiver 21. Thus it will be obvious that condensate forming on the evaporator coil will flow into the pan 37 from where it will move under the influence of gravity to the receiver in the condensate disposal assembly and be passed in heat exchange relation with the hot gas in the discharge line. This will serve to de-superheat the hot gas and also cause evaporation of the condensate.

As noted in Figure 3, line 40 is shown connecting the condenser with the evaporator. The line 40 has provided therein strainer 41 and a portion of a reduced diameter serving as a capillary 42. The latter element is shown as disposed in heat exchange relation with the suction line 43 emanating from accumulator 44 which is connected to the evaporator 35 through bracket 44'. Line 45 is shown connecting the accumulator with the evaporator coil.

As pointed out above, power shaft 16 extends from the motor 15 and has affixed to that portion disposed on the opposite side of the portion mounting fan 32, a wheel 46 of a blower assembly. The blower wheel is disposed within scroll 46' having an inlet opening 47' provided with a dished marginal portion at the rearward end thereof coaxial with the shaft and a discharge opening 48' in communication with the bottom of the framework 10.

The entire assembly is further provided with opposed side panels 47 and 48, a top cover 49, a rear panel 50 and a front panel 51, with the side and rear panels being formed on a single sheet. The panels referred to above serve as a housing and it will be noted that the front panel 51 contains a series of openings 52 having louvers positioned therein for permitting air to be moved from the enclosure inwardly of the unit by the fan 32. Further, the front panel 51 has a second series of openings 53 spaced vertically from the openings 52 and which permit air to be discharged from the unit after passing through the evaporator coil.

Considering the operation of the air conditioning unit, the assembly is placed over an opening 54 in a floor 55 of a conventional house trailer unit. The parts are so constructed and arranged that the lower frame 11 of the framework 10 spans the opening 54 and is supported on the portions of the floor adjacent the side walls of the opening 54.

The refrigeration system provides a cooling effect within the evaporator coil 35 as liquid refrigerant is vaporized therein in accordance with conventional mechanical refrigeration principles. The refrigerant in vapor form flows through the suction line 42' to the compressor 17. Accumulator 44 serves to collect any liquid refrigerant that remains unvaporized after passage through the evaporator coil 35. The vaporous or gaseous refrigerant is compressed in the compressor 17 and passes through discharge line 24 which in turn passes through the condensate disposal receiver 21 and upwardly into the condenser 19. In the condenser, the gaseous refrigerant is converted to the liquid phase in response to the cooling action provided by the air moving under the influence of the blower. The liquid refrigerant then passes through line 40, capillary 42 into the evaporator coil 35. After passing through the capillary the refrigerant moves from the high pressure side of the refrigeration system to the low pressure side. In the latter side, the pressure is such that the refrigerant will vaporize at temperatures lower than the temperature of the air within the enclosure to which the refrigerant is subjected as outlined below. Thus it will be evident that the desired cooling effect will be produced and continued as the cycle is repeated.

Air is drawn inwardly from the enclosure through the lower openings 52 in the front panel 51 of the housing and is directed upwardly and outwardly over the evaporator coil 35 and discharged from the unit. The casing 27 and the top panel 49 of the housing serve to define the particular path of movement of the air over the evaporator coil.

With respect to the flow of air over the condenser coil, it will be noted that the side panels 47 and 48, a rear panel 50, and the top panel 49 permit the blower assembly to move air upwardly through the bottom of the frame over the motor and compressor, rearwardly through the condenser coil 19, downwardly to the inlet side of the blower where it is discharged downwardly through the bottom of the frame. The connecting panel 22 of the condensate disposal assembly is provided with an opening having a dished marginal portion in alignment with the inlet of the blower so as to permit the path of air flow described. It has been found that the velocity of the air moving through the discharge outlet of the scroll 48' surrounding the blower 46 should be much greater than the velocity of the air moving upwardly through the bottom frame. This permits dispersion of the warm air that has travelled over the condenser and compressor so that recirculation of the warm air will be maintained at a minimum.

It will be noted that the rear wall 30 of the casing 27 in effect, defines a forward compartment wherein the evaporator and fan are mounted and a rearward compartment wherein the supporting frame and the compressor and condenser are located. This unique construction permits the individual components of the refrigeration system to be mounted, in effect, above the upper frame 12 of the framework so that it gives the unit the appearance of being top heavy. However, it is this unique arrangement that permits the use, for cooling purposes, of the air which is disposed beneath the trailer floor, positioned a short distance above the ground.

Thus, it will be obvious that the air conditioning unit described is particularly adapted to home trailers wherein it is necessary and desirable to avoid the mounting of air conditioning units in the side or rear walls of the trailer. Certain structural changes may be made if desired. For illustration, baffles may be mounted on the sides of framework 10 for directing the air upwardly through the framework in a predetermined path. Also the outlet of the scroll 46' may be provided with a duct extending therefrom either downwardly, note Figure 1, or along the underside of the trailer floor so as to discharge the cooling air into the atmosphere at the side of the trailer. Conventional insulation may be employed throughout the assembly.

While the invention has been described with respect to one form, it will be obvious that it is possible to produce still other embodiments without departing from the inventive concept herein disclosed and it is desired therefore that only such limits be imposed on the appended claims as are stated therein, or required by the prior art.

We claim:

1. Air conditioning apparatus comprising a supporting frame, a casing having opposed side walls and an end wall forming a compartment, said casing being attached to one side of the frame, a prime mover mounted on said frame with the power shaft thereof extending within said compartment, an evaporator supported on the opposed side walls of said casing above the power shaft, a fan mounted on that portion of the power shaft within said casing, a compressor and condenser mounted on the frame above said prime mover, a blower wheel secured to the power shaft of said prime mover, a scroll having an outlet and an inlet remote from said outlet surrounding said blower, and means surrounding the frame and casing for defining a path of air flow under the influence of the blower wheel upwardly through a side of the frame, over the prime mover, compressor and the condenser into the scroll inlet to be forcibly discharged through the same side of the frame that the air was originally moved upwardly.

2. Apparatus of the type described in claim 1 wherein the inlet of the scroll is positioned below the condenser coaxial with the prime mover power shaft.

3. Apparatus of the type described in claim 1 including means for disposing of condensate collected from the evaporator.

4. In air conditioning apparatus for cooling the air within an enclosure having an opening in a floor spaced above the ground, a housing located entirely within the enclosure surrounding the opening, a frame positioned centrally of said housing adapted to span said opening, a condenser mounted on said frame, a compressor mounted on said frame longitudinally from said condenser, and means for moving air upwardly through an inlet portion of the frame, over the compressor, rearwardly through the condenser and downwardly through an outlet portion of the frame, said inlet portion being of greater area than said outlet portion so as to cause the rate of discharge through the frame to disperse the air beyond the area from which air is being drawn upwardly into the frame.

5. In combination with an enclosure having an opening in the floor thereof, an air conditioning unit comprising a housing, having an end panel provided with upper and lower openings; a frame positioned within said housing about the floor opening; a casing, forming with one end of the housing, a compartment separate from said frame; a motor mounted on said frame with the power shaft thereof projecting within said compartment; an evaporator mounted in the upper portion of said compartment; a fan mounted in the lower portion of said compartment for routing air from the enclosure through the lower opening in said end panel, upwardly over the evaporator and outwardly through the upper opening in said end panel; a compressor and a condenser mounted on said frame in said housing; and means for directing air upwardly through a portion of the frame, over the compressor, condenser and downwardly through a second portion of the frame.

6. The combination as set forth in claim 5 wherein the portion of the frame through which air is directed upwardly being of greater area than said second portion of said frame whereby the velocity of the air moving downwardly through the frame is greater than the velocity of the air moving upwardly through the frame.

7. Air conditioning apparatus comprising a housing having opposed side and end panels and a top panel; a partition positioned within said housing to form a forward and a rear compartment; an evaporator mounted in said forward compartment; a fan positioned in said forward compartment in spaced relation to said evaporator; a supporting frame mounted in said rear compartment; a compressor and condenser mounted on said frame, and means mounted in said rear compartment for routing air upwardly through a portion of the bottom of the rear compartment over the compressor and condenser and downwardly through a second portion of the bottom of the rear compartment to the outside of the unit.

8. Apparatus as described in claim 7 wherein said last mentioned means includes a blower mounted on said frame, a scroll surrounding the blower, said scroll being provided with an inlet and an outlet for discharging the air at a velocity in excess of the velocity of the air entering the bottom of the rear compartment.

9. Air conditioning apparatus comprising a housing adapted to be placed above an opening in a floor, said housing having a front wall provided with vertically spaced openings; a supporting frame positioned centrally of said housing with the sides thereof adjacent the opposed sides of the housing; a casing having opposed side walls, and an end wall positioned longitudinally of said frame with the end wall secured to one side of the frame, said casing, forming, with the housing, a compartment; a motor having a power shaft mounted on said frame with the power shaft having a portion thereof extending within said compartment; an evaporator mounted within said compartment; a fan mounted on the shaft within the compartment for routing air from an enclosure to be conditioned through said lower opening in said front housing wall over the evaporator coil and through the upper opening; and means including a compressor and a condenser mounted in spaced relation on the top of the supporting frame communicating with the evaporator which evaporates liquid refrigerant therein to cool the air moving under the influence of the fan over the evaporator coil, and means to draw air through said opening in said floor for removing heat from the condenser.

References Cited in the file of this patent

UNITED STATES PATENTS

| | | |
|---|---|---|
| 2,234,771 | Moore | Mar. 11, 1941 |
| 2,296,997 | Knoy | Sept. 29, 1942 |
| 2,364,287 | Gould | Dec. 5, 1944 |
| 2,480,510 | Roper | Aug. 30, 1949 |
| 2,489,009 | Corhanidis | Nov. 22, 1949 |
| 2,549,547 | Trask | Apr. 17, 1951 |
| 2,576,549 | Wagner | Nov. 27, 1951 |
| 2,753,696 | Guerra | July 10, 1956 |